United States Patent
Wu (10) Patent No.: US 10,338,643 B2
(45) Date of Patent: Jul. 2, 2019

(54) MAGNETIC ELECTRONIC DEVICE

(71) Applicant: HOLYGO CORPORATION, Taipei (TW)

(72) Inventor: Chien-Te Wu, Taipei (TW)

(73) Assignee: HOLYGO CORPORATION, Taipei (TW)

(*) Notice: Subject to any disclaimer, the term of this patent is extended or adjusted under 35 U.S.C. 154(b) by 137 days.

(21) Appl. No.: 15/271,098

(22) Filed: Sep. 20, 2016

(65) Prior Publication Data
US 2017/0083055 A1    Mar. 23, 2017

(30) Foreign Application Priority Data

Sep. 21, 2015 (TW) ............................. 104215241 U
Jul. 27, 2016 (TW) ............................. 105211361 U (51) Int. Cl.
| | | |
|---|---|---|
| *G06F 1/16* | (2006.01) | |
| *G06F 1/3287* | (2019.01) | |
| *G06F 1/3206* | (2019.01) | |

(52) U.S. Cl.
CPC .......... *G06F 1/1677* (2013.01); *G06F 1/1616* (2013.01); *G06F 1/3206* (2013.01); *G06F 1/3287* (2013.01)

(58) Field of Classification Search
CPC .. H05K 9/0073; H05K 9/0075; H05K 9/0081; H05K 9/0084; H05K 9/0086; H04N 5/23293; G01D 5/142; G01D 5/145; G01R 33/06; G01R 33/07; G01R 33/073; G01R 33/09; G01R 33/091; G01R 33/093; G01R 33/095; G01R 33/096; G01R 33/098; G01B 7/14; G06F 1/1677; G06F 1/1616; G06F 1/3287; G06F 1/3206
See application file for complete search history.

(56) References Cited

U.S. PATENT DOCUMENTS

| | | | | |
|---|---|---|---|---|
| 7,085,119 B2* | 8/2006 | Bilotti | ................ | H03K 17/9517 361/139 |
| 8,243,438 B2* | 8/2012 | Wang | .................... | G06F 1/1616 292/151 |

(Continued)

OTHER PUBLICATIONS

"Hall Effect IC Applications Guide (AN27701)—Allegro Microsystems" Internet Citation, Mar. 2000 (Mar. 2000), XP02327742, Retrieved from the Internet: URL http://www.alegromicro.com/techpub2/an/an27701.pdf (hereinafter Allegro). (Year: 2000).*

*Primary Examiner* — Douglas X Rodriguez
(74) *Attorney, Agent, or Firm* — Maschoff Brennan (57) ABSTRACT

A magnetic electronic device includes a first body and a second body. The first body includes a first case and a magnetic member inside the first case. The second body includes a second case and includes a magnetic sensor, a magnetism guiding member and a switch control component inside the second case. The second case is connected to the first body to be movable relative to the first body. The magnetic sensor is disposed on the magnetism guiding member, and the switch control component is electrically connected to the magnetic sensor. The magnetism guiding member guides the magnetic field caused by the magnetic member, and the magnetic sensor detects the magnetic flux caused by the magnetic member. When the magnetic flux is larger than a first value, the switch control component switches a component's switch.

20 Claims, 9 Drawing Sheets

(56) References Cited

U.S. PATENT DOCUMENTS

| | | | |
|---|---|---|---|
| 2004/0227407 A1* | 11/2004 | Nagai | G06F 1/1616 307/112 |
| 2009/0072818 A1* | 3/2009 | Mizuno | G01D 5/145 324/207.24 |
| 2011/0306392 A1* | 12/2011 | Qin | H04M 1/0214 455/575.1 |

* cited by examiner

MAGNETIC ELECTRONIC DEVICE

CROSS-REFERENCE TO RELATED APPLICATIONS

This non-provisional application claims priorities under 35 U.S.C. § 119(a) on Patent Applications No(s). 104215241 and 105211361 respectively filed in Taiwan, R.O.C. on Sep. 21, 2015 and Jul. 27, 2016, and the entire contents of which are hereby incorporated by reference.

BACKGROUND

Technical Field

The disclosure relates to a magnetic electronic device, more particularly to a magnetic electronic device having one or more magnetic sensors.

Related Art

The development of technology allows people to use a variety of mobile electronic devices to do a variety of works. As an example, these mobile electronic devices include notebook computers, smart phones or tablet computers. A notebook computer includes a display for displaying interesting contents to a viewer, and a host for receiving and processing this viewer's command. A notebook computer may further include a pivot or hinge, through which the display can be connected to the host and pivotable relative to the host.

A notebook computer may further include a detection module to detect the switching-on-and-off of the display for power saving. When the display is covered, the host may automatically turn off the screen of the display according to the signal issued by the detection module for power saving. Specifically, an implementation of the detection module is carried out by a magnetic member and a magnetic sensing member. The magnetic sensing member detects the variations in magnetic force according to the variations in distance between itself and the magnetic member to learn of whether the display is covered or not. However, such a pivot is typically made of metal, has permeability, and is easily magnetized. If the magnetic sensing member is too close to the pivot, the pivot will affect the relative position of the magnetic sensing member and the magnetic member for detection, and this affect may cause the display to be unintentionally turned off or on. If the magnetic sensing member is farther from the pivot, a stronger magnetic force will be required by the magnetic sensing member to sense the magnetic field caused by the magnetic member. As a result, a higher cost is required to design notebook computers.

SUMMARY

The disclosure provides a magnetic electronic device to resolve the above problems in the art.

According to one or more embodiments, a magnetic electronic device includes a first body and a second body. The first body includes a first case and a magnetic member, and the magnetic member is disposed inside the first case. The second body includes a second case, a magnetic sensor, a magnetism guiding member and a switch control component, and the magnetic sensor, the magnetism guiding member and the switch control component are located inside the second case. The second case is connected to the first body to be movable relative to the first body. The magnetic sensor is disposed on the magnetism guiding member, and the switch control component is electrically connected to the magnetic sensor. The magnetism guiding member guides a magnetic field caused by the magnetic member. The magnetic sensor detects a magnetic flux caused by the magnetic member. When the magnetic flux of the magnetic member detected by the magnetic sensor is larger than a first value, the switch control component controls the switching-on-or-off of a component.

In another embodiment, the first body has a first side, the second body has a second side, and the magnetic electronic device further includes a pivot member pivotably connected to the first side of the first body and the second side of the second body.

In another embodiment, a distance between the magnetic member and the pivot member is substantially equal to a distance between the magnetic sensor and the pivot member.

In another embodiment, the first body is connected to the second body through the pivot member so that the first body is movable relative to the second body to be at a first position or a second position; and a distance between the magnetic sensor and the magnetic member at the first position is longer than another distance between the magnetic sensor and the magnetic member at the second position.

In another embodiment, the magnetic flux of the magnetic field of the magnetic member detected by the magnetic sensor is smaller than the first value when the first body is at the first position; and the magnetic flux of the magnetic field of the magnetic member detected by the magnetic sensor is larger than or substantially equal to the first value when the first body is at the second position.

In another embodiment, the magnetic flux of the magnetic member propagated by the pivot member and detected by the magnetic sensor is constantly smaller than the first value.

In another embodiment, the magnetism guiding member includes a permeance body and an extended member, and the extended member extends from a side of the permeance body.

In other embodiments, an edge of the extended member on a size far from the permeance body is an arc or has at least one break angle. Optionally, an edge of the extended member on a size far from the permeance body includes a first edge segment, a second edge segment and a third edge segment, two ends of the second edge segment are respectively abut the first edge segment and the third edge segment, the first edge segment and the third edge segment abut the permeance body, an extension direction of the first edge segment has an angle with an extension direction of the third edge segment, and the first edge segment and the third edge segment are substantially straight. Optionally, an edge of the extended member on a side far from the permeance body includes a first edge segment, a second edge segment and a third edge segment, two ends of the second edge segment respectively abut the first edge segment and the third edge segment, the first edge segment and the third edge segment abut the permeance body, and the first edge segment and the third edge segment are curves.

In another embodiment, the extended member has a symmetric shape. Optionally, the extended member has an asymmetric shape.

In another embodiment, the permeance body is a quadrilateral plate.

In the above magnetic electronic device, one or more magnetism guiding members are disposed to a magnetic sensor to extend and guide the magnetic field caused by one or more magnetic members, so the magnetic sensor can sense the magnetic field of the magnetic member as being far from the magnetic member. Therefore, the magnetic sensor and the one or more magnetic members can respectively be disposed at better positions to avoid the interference from other components and enhance the sensing accuracy. Also, a magnetic sensor having relatively-few power consumption is chosen as maintaining its sensing effect. Therefore, the disclosure may save power and reduce the design cost.

Moreover, the design of the appearance of magnetism guiding members can achieve an effect of strengthening magnetic force, so as to increase the detectable distance of the magnetic sensor and enhance the sensitivity of the magnetic sensor.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
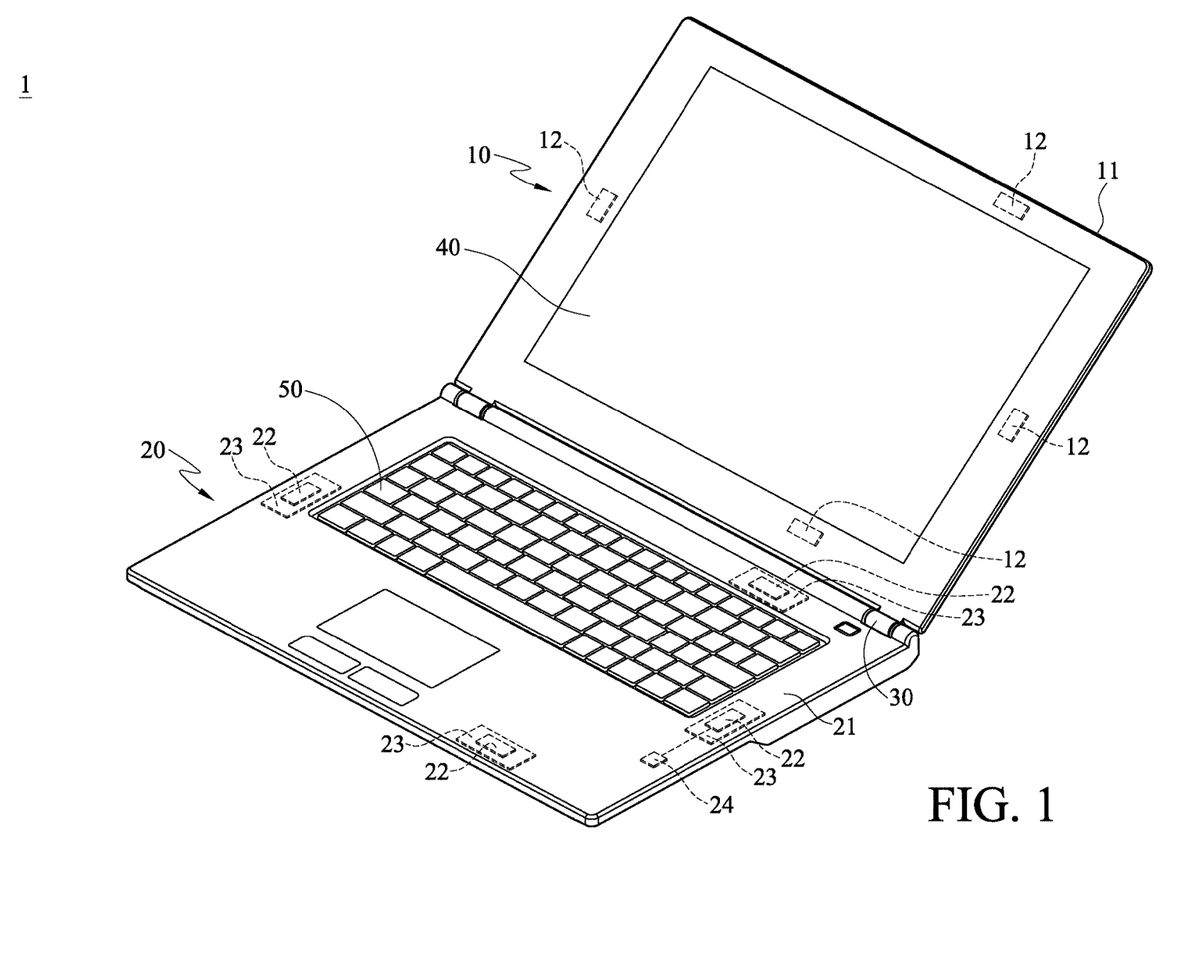
FIG. 1 is a schematic stereoscopic view of a magnetic electronic device in an embodiment of the disclosure.
Figure 2:
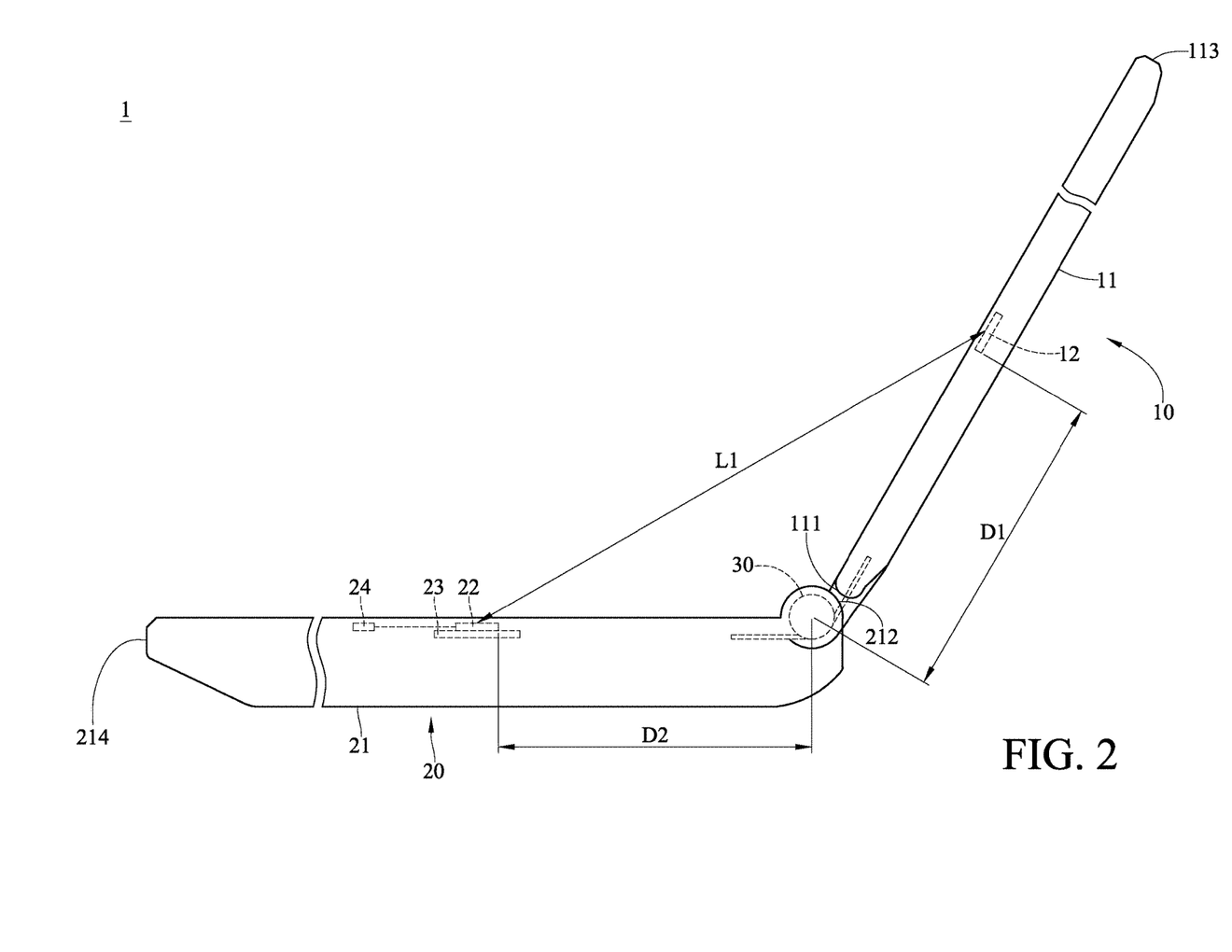
FIG. 2 is a schematic side view of the magnetic electronic device in FIG. 1.

Please refer to FIG. 1 and FIG. 2. FIG. 1 is a schematic stereoscopic view of a magnetic electronic device in an embodiment of the disclosure, and FIG. 2 is a schematic side view of the magnetic electronic device in FIG. 1.

A magnetic electronic device 1 includes a first body 10, a second body 20 and an electronic component 40. The first body 10 is connected to the second body 20, and the electronic component 40 is disposed to the first body 10 or the second body 20. In this magnetic embodiment, the electronic component 40 is disposed to the first body 10. For example, the magnetic electronic device 1 is a notebook computer, and the electronic component 40 is a display. In another embodiment, the first body 10 of the magnetic electronic device 1 is a tablet computer, and the second body 20 is a base stand or an input platform. In this or some embodiments, the magnetic electronic device 1 further includes a pivot member 30 used to pivotably connected to the first body 10 and the second body 20, so the first body 10 and the second body 20 can pivot on the pivot member 30 to be at a respective variety of positions. For example, the material of the pivot member 30 is metal, so as to enhance the fixing effect.

The first body 10 includes a first case 11 and a plurality of magnetic members 12. The magnetic members 12 are disposed inside the first case 11. The first case 11 has a first side 111 and a third side 113 opposite to the first side 111. For example, the magnetic member 12 is a permanent magnet. Moreover, the disclosure is not limited to the amount of the magnetic members 12 in the figure, and the amount of the magnetic members 12 can be changed according to a variety of requirements of design.

The second body 20 includes a second case 21 and a plurality of magnetic sensors 22, a plurality of magnetism guiding members 23 and a switch control component 24. The second case 21 has a second side 212 and a fourth side 214 opposite to the second side 212. The second side 212 of the second case 21 is relatively-movably connected to the first side 111 of the first case 11. In this embodiment, the first distance D1 between the magnetic member 12 and the pivot member 30 is substantially equal to the second distance D2 between the magnetic sensor 22 and the pivot member 30. Therefore, the distance between the first side 111 of the first case 11 and the second side 212 of the second case 21 is constant, and the distance between the third side 113 of the first case 11 and the fourth side 214 of the second case 21 is varied with the rotation of the first body 10 relative to the second body 20 or the rotation of the second body 20 relative to the first body 10.

Furthermore, the magnetic sensors 22, the magnetism guiding members 23 and the switch control component 24 are disposed inside the second case 21. The magnetic sensor 22 is disposed on the magnetism guiding member 23, and the switch control component 24 is electrically connected to the magnetic sensors 22. The magnetism guiding member 23 is a permeable material, and the magnetism guiding member 23 is used to extend and guide the magnetic field caused by the magnetic member 12. The magnetic sensor 22 is used to detect the magnetic flux caused by the magnetic member 12. In this embodiment, the magnetic sensor 22 is, for example, a Hall sensor, and the material of the magnetism guiding member 23 contains, for example, a permeable material that is not easily magnetized by the magnetic member 12. For example, the material of the magnetism guiding member 23 is not limited to be a ferrite sheet or silicon steel. For example, the switch control component 24 is an embedded controller. As a Hall sensor, when a magnetic field detected is larger than a first value, a first Hall voltage will be sent to the switch control component 24, so the switch control component 24 will turn off the electronic component 40; otherwise, when a magnetic field detected is smaller than or substantially equal to the first value, a second Hall voltage will be sent to the switch control component 24, so the switch control component 24 will turn on the electronic component 40. In addition, since the magnetic sensor 22 is far from the pivot member 30, the magnetic flux of the magnetic member 12 guided by the pivot member 30 and detected by the magnetic sensor 22 is constantly smaller than the first value. Therefore, the magnetic field of the magnetic member 12 guided by the pivot member 30 would not affect the detection result of the magnetic sensor 22, resulting in the enhancement of the sensing accuracy of the magnetic sensor 22.

On the other hand, in some embodiments, if the magnetic field detected by the magnetic sensor 22 is larger than the first value, a first Hall voltage will be sent to the switch control component 24, so the switch control component 24 will turn off the electronic component 40; and if the magnetic field detected by the magnetic sensor 22 is smaller than or substantially equal to a second value, the magnetic sensor 22 will send a second Hall voltage to the switch control component 24, so the switch control component 24 will turn off the electronic component 40. The above first value is substantially equal to or larger than the second value. For example, the first value is 15 gausses, the second value is 5 gausses, and if the magnetic flux detected by the magnetic sensor 22 is up to 15 gausses, the electronic component 40 will be turned off; and if the magnetic flux detected by the magnetic sensor 22 drops to 5 gausses, the electronic component 40 will be turned on. In details, a Hall sensor with magnetic hysteresis varies its output Hall voltage in response to a magnetic field, so the value of the magnetic flux detected by the Hall sensor is varied.

In the disclosure, disposing the magnetic sensor 22 to the magnetism guiding member 23 means that the magnetic sensor 22 is directly connected to the magnetism guiding member 23 or the magnetic sensor 22 is adjacent to but not connected to the magnetism guiding member 23. Therefore, the magnetism guiding member 23 is able to extend a magnetic field and guide it to the magnetic sensor 22. Moreover, the disclosure is not limited to the amount of the magnetic sensors 22 and the amount of the magnetism guiding members 23 in the figure, and they can be designed according to a variety of requirements.

In addition, in this or some embodiments, the magnetic electronic device 1 further includes an input module 50 disposed to the second case 21. For example, the input module 50 is a keyboard, but the disclosure is not limited thereto. In another embodiment, the input module 50 is a touch panel.

The operation of the electronic device 1 is illustrated below. Assume that initially, as shown in FIG. 2, the magnetic sensor 22 and the magnetic member 12 have a first distance L1 therebetween and the electronic component 40 has been turned on.

Figure 3:
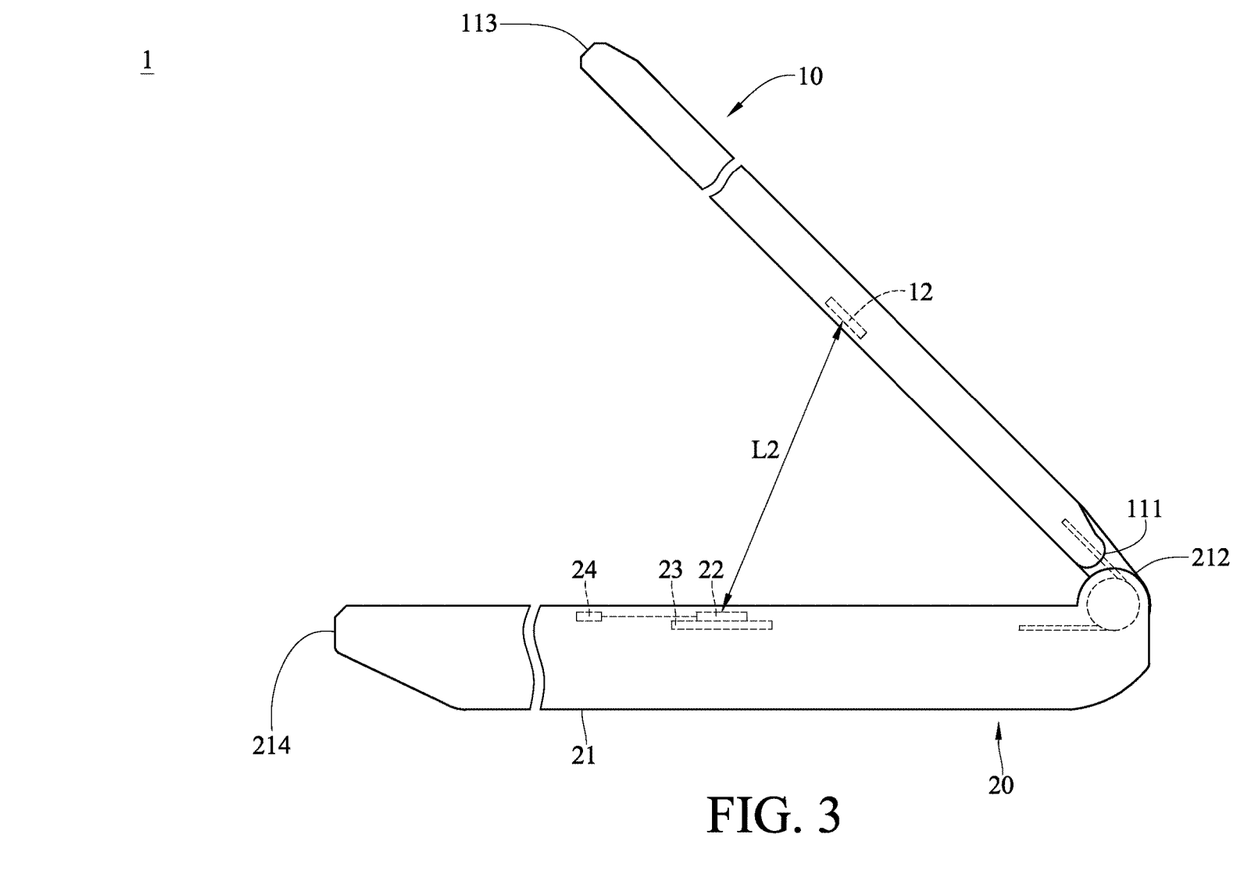
FIG. 3 is a schematic side view of the magnetic electronic device as the second body is at a position in an embodiment of the disclosure.

Please refer to FIG. 3, which is a schematic side view of the electronic device as the second body is at a position in an embodiment. Then, push the first body 10 so that the first body 10 rotates toward the second body 20. Herein, the first body 10 is at a first position relative to the second body 20, and the magnetic sensor 22 and the magnetic member 12 have a second distance L2 therebetween. Meanwhile, the magnetic flux of the magnetic member 12 detected by the magnetic sensor 22 is smaller than or substantially equal to the first value, so the electronic component 40 is kept turned-on.

Figure 4:
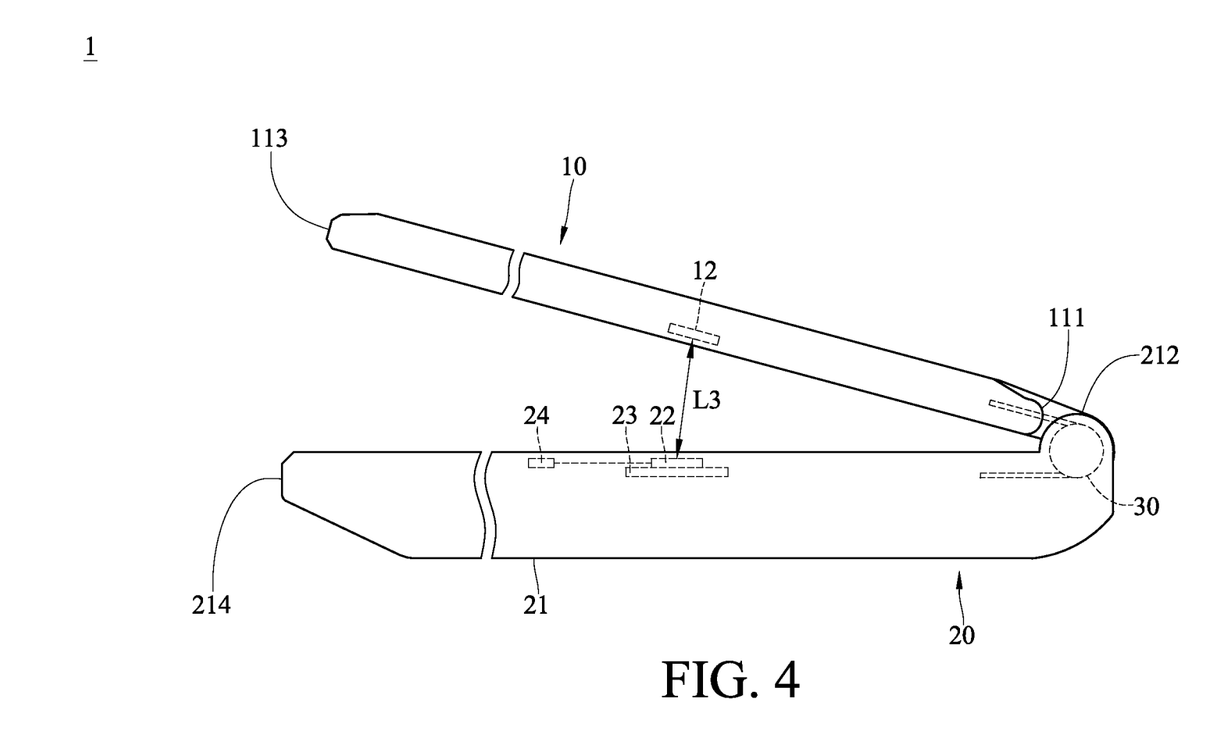
FIG. 4 is a schematic side view of the magnetic electronic device as the second body is at another position in an embodiment of the disclosure.

Please refer to FIG. 4, which is a schematic side view of the magnetic electronic device as the second body id at another position in an embodiment.

Next, continue pushing the first body 10 so the first body 10 rotates toward the second body 20 more. Herein, the first body 10 is at a second position relative to the second body 20. The magnetic sensor 22 and the magnetic member 12 have a second distance therebetween. The second distance L2 between the magnetic sensor 22 and the magnetic member 12 at the first position is longer than the third distance L3 between the magnetic sensor 22 and the magnetic member 12 at the second position. Herein, the magnetic flux of the magnetic member 12 detected by the magnetic sensor 22 is larger than the first value, so the switch control component 24 turns off the electronic component 40 by switching off the switch of the electronic component 40. In constant, if it would like to turn on the electronic component 40, the first body 10 is pivoted away from the fourth side 214 of the second case 21 of the second body 20 until the magnetic flux of the magnetic member 12 detected by the magnetic sensor 22 is smaller than or substantially equal to a certain value, so as to automatically turn on the electronic component 40.

The following description introduces the effect upon the detection effect of the magnetic sensor 22, brought in by the magnetism guiding member 23. First, a control group is established, in which no magnetism guiding member 23 (e.g. ferrite sheet) is disposed as magnetic members 12 (e.g. permanent magnets) respectively have 1, 2, 3 and 4 cm distances with a magnetic sensor. In the case of the control group, the magnetic sensor senses that magnetic fluxes of the magnetic members 12 are respectively 70, 25, 3 and 2 gausses. Then, an experimental group is established, in which magnetism guiding members 23 are disposed to a magnetic sensor as magnetic members 12 respectively have 1, 2, 3 and 4 cm distances with the magnetic sensor. In the case of the experimental group, the magnetic sensor senses that the magnetic fluxes of the magnetic members 12 are respectively 143, 78, 52 and 21 gausses. In view of the comparison between the control group and the experimental group, the magnetism guiding members 23 can enlarge and guide the magnetic field.

Therefore, the magnetic electronic device 1 in the disclosure can be disposed with a magnetic sensor having relatively-few power consumption and a relatively-small size and still achieve the same sensing effect. Also, under the same power consumption, the magnetic sensor and the magnetic members 12 can be disposed far away from the pivot member, so as to avoid the interference from the permeability of the pivot member. Additionally, the dispositions of the magnetism guiding members 23 and the magnetic sensor can be designed according to a variety of conditions to achieve a small, light, thin magnetic electronic device 1.

Note that the disposition of the pivot member 30 does not limit the disclosure; in another embodiment, even if the pivot member 30 is removed, the disclosure still can control the switching of the switch of the electronic component 40 by employing the magnetic sensor 22 to monitor the magnetic field of the magnetic member 12 extended by the magnetism guiding member 23.

In the above magnetic electronic device, one or more magnetism guiding members are disposed to one or more magnetic sensors to extend and guide the magnetic field caused by one or more magnetic members.

Therefore, such a magnetic sensor still could sense the magnetic field of the magnetic member even if the magnetic sensor is far from the magnetic member. In this way, the magnetic sensor and the magnetic member can be disposed at a respective better position to avoid the interference from other components (such as a pivot member) and enhance the sensing accuracy. Moreover, a magnetic sensor having relatively-few power consumption is chosen as maintaining its sensing effect, so the disclosure may save power.

On the other hand, the disclosure further provides a variety of designs for the appearance of the above magnetism guiding member 23 to increase the detectable distance of the above magnetic sensor 22 and enhance the sensitivity of the above magnetic sensor 22. The following exemplarily illustrates different designs of the magnetism guiding member 23 in different embodiments to, and however, the disclosure is not limited to these embodiments.

Figure 5A:
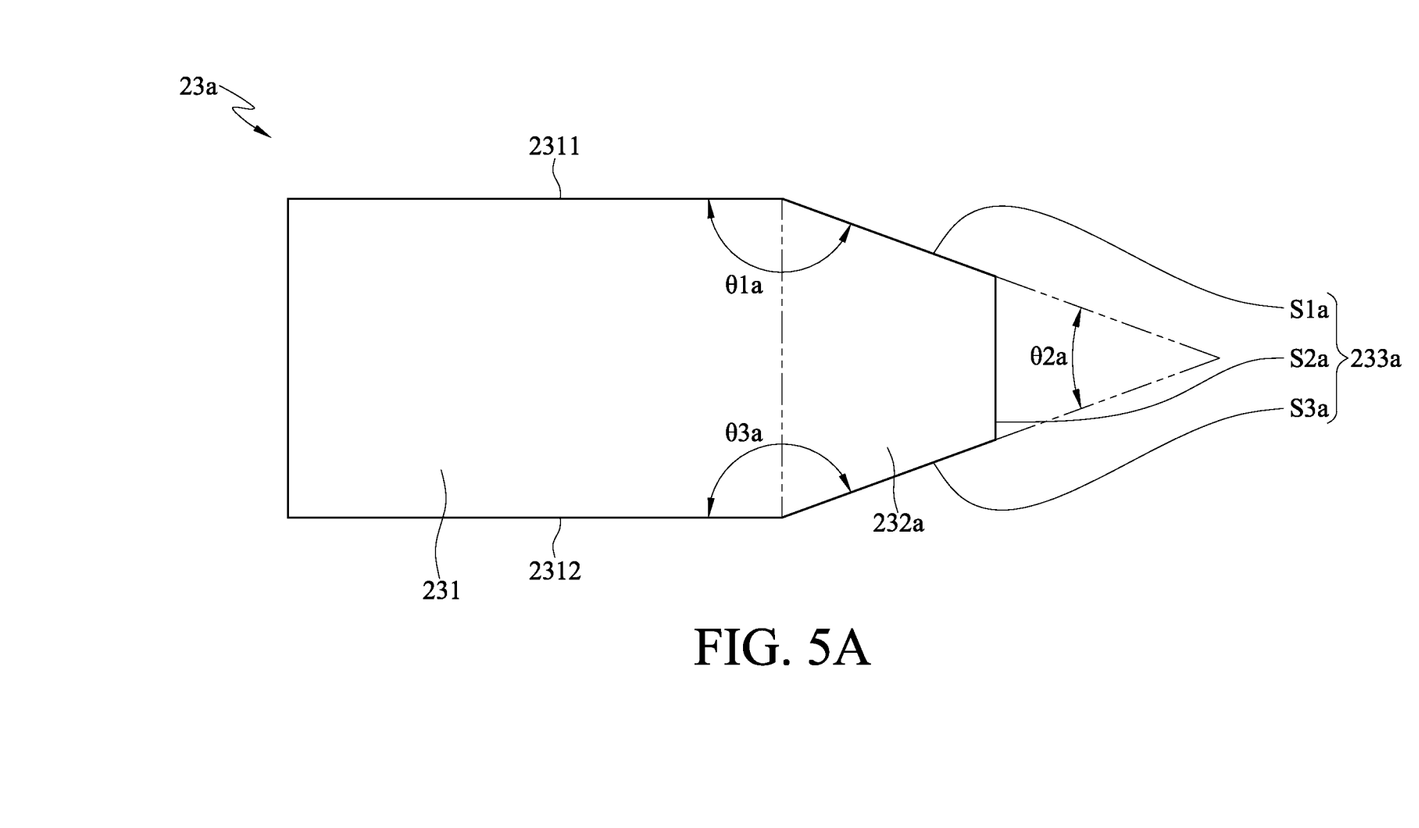
FIG. 5A to FIG. 5D are respective top views of a magnetism guiding member having a variety of angles between its edges in different embodiments of the disclosure.

Please refer to FIG. 5A, which is a top view of a magnetism guiding member in an embodiment of the disclosure. As shown in the figure, the magnetism guiding member 23a includes a permeance body 231 and an extended member 232a. The extended member 232a extends from a side of the permeance body 231. An edge 233a of the extended member 232a on a side far from the permeance body 231 includes a first edge segment S1a, a second edge segment S2a and a third edge segment S3a. Two opposite ends of the second edge segment S2a respectively abut the first edge segment S1a and the third edge segment S3a, and the first edge segment S1a and the third edge segment S3a abut the permeance body 231. The first edge segment S1a and a first edge 2311 of the permeance body 231 adjacent to the first edge segment S1a have an angle θ1a therebetween, the extension direction of the first edge segment S1a and the extension direction of the third edge segment S3a have an angle θ2a therebetween, and the third edge segment S3a and a second edge 2312 of the permeance body 231 adjacent to the third edge segment S3a have an angle θ3a therebetween.

In this embodiment, the permeance body 231 is, for example, but not limited to, a quadrilateral plate. In other embodiments, the shape of the permeance body 231 can be designed according to requirements of actual applications.

In this embodiment, the first edge segment S1a and the third edge segment S3a are symmetric. In another embodiment, the first edge segment S1a and the third edge segment S3a are asymmetric.

In this embodiment, the first edge segment S1a and the third edge segment S3a are not limited to be substantially straight. In other embodiments, at least one of the first edge segment S1a and the third edge segment S3a is a straight line, a curve or a combination thereof.

In this embodiment, the first edge segment S1a and the third edge segment S3a are not limited to have the same distance. In other embodiments, the first edge segment S1a and the third edge segment S3a have different distances.

In this embodiment, the second edge segment S2a is substantially straight, but the disclosure is not limited thereto. In other embodiments, the second edge segment S2a is a curve, such an arc, a curve constituted by arcs, or a curve constituted by at least one arc and at least one straight line.

In this embodiment, the length of the second edge segment S2a can be designed according to requirements of actual applications, and the disclosure has no limitation thereon.

In an embodiment, the second edge segment S2a can be configured to contact the magnetic sensor 22 in the aforementioned embodiments. In other embodiments, the second edge segment S2a can be adjacent to but not contact the magnetic sensor 22.

In this embodiment, the angles θ1a and θ3a are substantially the same, but the disclosure is not limited thereto. In other embodiments, the angles θ1a and θ3a are different.

Figure 5B:
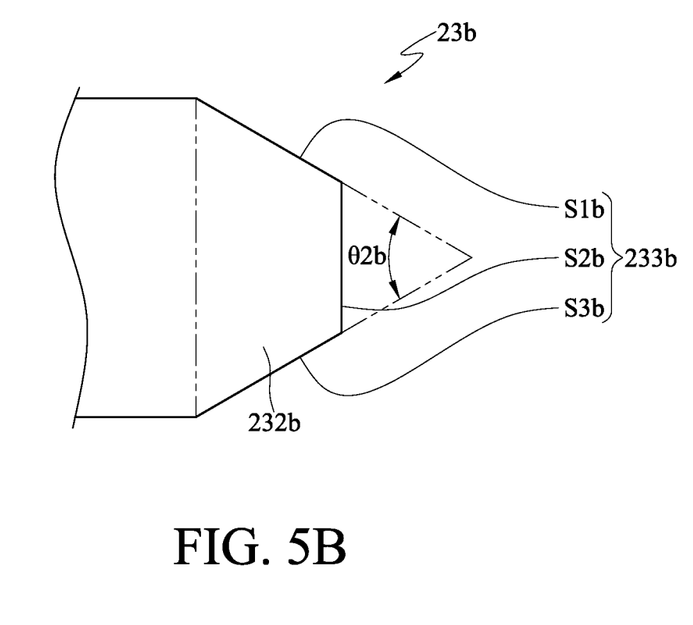
Figure 5C:
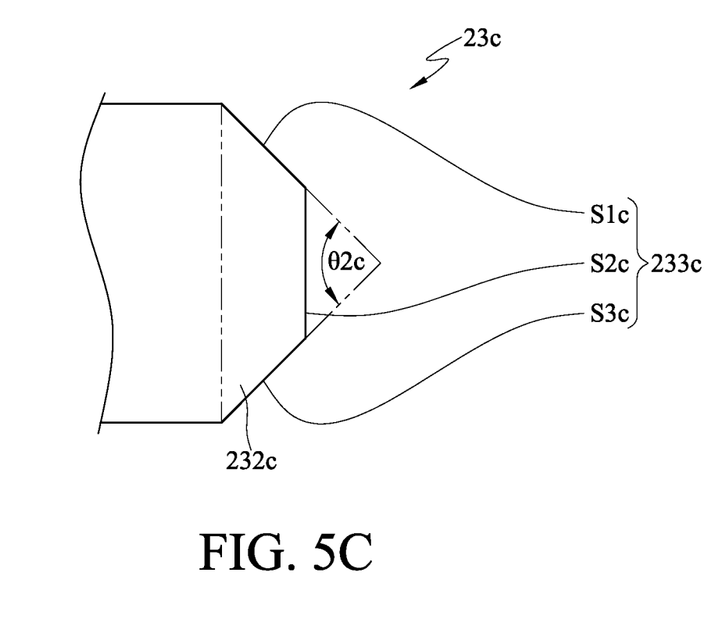
Figure 5D:
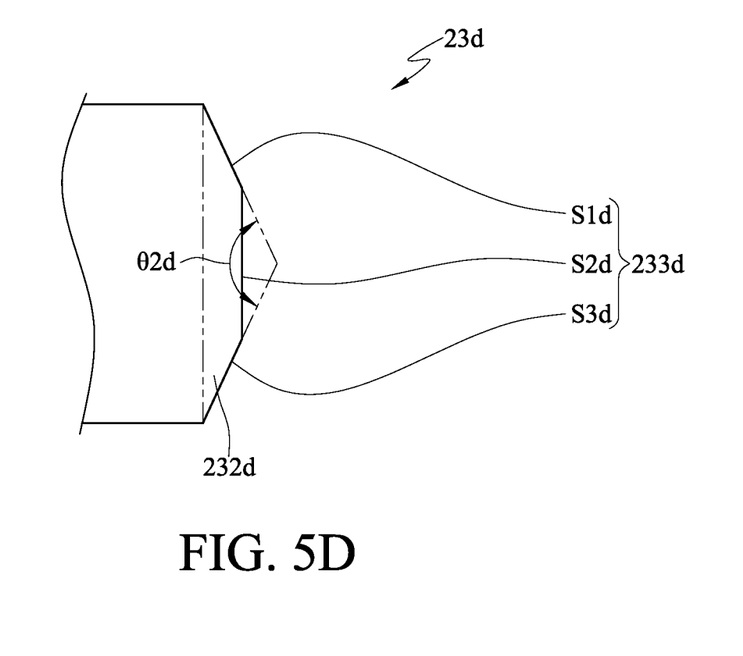

In this embodiment, the angle θ2a of the magnetism guiding member 23a is 40 degrees, but the disclosure is not limited thereto. In other embodiments, for the extended member 232b of the magnetism guiding member 23b as shown in FIG. 5B, the extension direction of the first edge segment S1b and the extension direction of the third edge segment S3b have an angle θ2b of 60 degrees therebetween; for the extended member 232c of the magnetism guiding member 23c as shown in FIG. 5C, the extension direction of the first edge segment S1c and the extension direction of the third edge segment S3c have an angle θ2c of 90 degrees therebetween; and for the extended member 232d of the magnetism guiding member 23d as shown in FIG. 5D, the extension direction of the first edge segment S1d and the extension direction of the third edge segment S3d have an angle θ2d of 130 degrees therebetween. However, the disclosure does not limit the angle between the extension direction of the first edge segment and the extension direction of the third edge segment.

Figure 6:
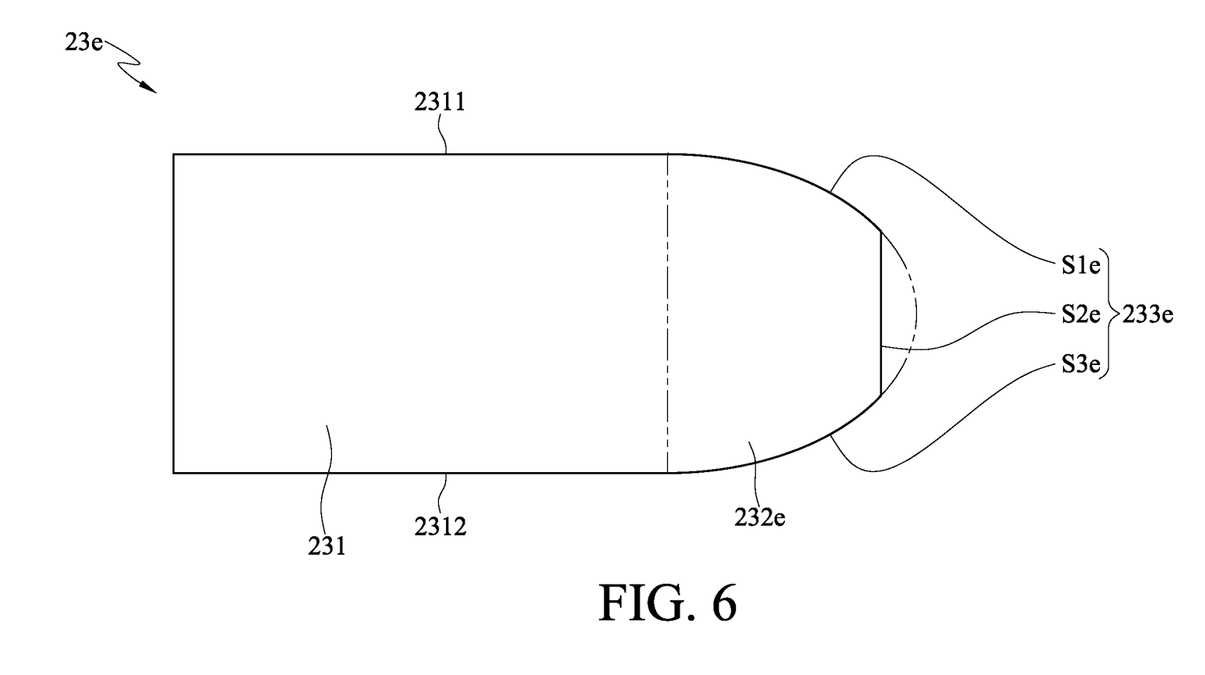
FIG. 6 is a top view of a magnetism guiding member in another embodiment of the disclosure.

Please refer to FIG. 6, which is a top view of a magnetism guiding member in another embodiment of the disclosure. As shown in the figure, the magnetism guiding member 23e includes a permeance body 231 and an extended member 232e. The extended member 232e extends from a side of the permeance body 231. An edge 233e of the extended member 232e on a side far from the permeance body 231 includes a first edge segment S1e, a second edge segment S2e and a third edge segment S3e. Two opposite ends of the second edge segment S2e respectively abut the first edge segment S1e and the third edge segment S3e, and the first edge segment S1e and the third edge segment S3e respectively abut a first edge 2311 and a second edge 2312 of the permeance body 231.

In this embodiment, the first edge segment S1e and the third edge segment S3e are symmetric to each other. In another embodiment, the first edge segment S1e and the third edge segment S3e are asymmetric to each other.

In this embodiment, the first edge segment S1e and the third edge segment S3e are arcs, but the disclosure is not limited thereto. In other embodiments, at least one of the first edge segment S1e and the third edge segment S3e is substantially a straight line, a curve or a combination thereof. Specifically, in this embodiment, the first edge segment S1e and the third edge segment S3e are convex arcs, but the disclosure is not limited thereto. In other embodiments, at least one of the first edge segment S1e and the third edge segment S3e can be a convex arc, a concave arc or a combination thereof.

In this embodiment, the first edge segment S1e and the third edge segment S3e substantially have the same distance, but the disclosure is not limited thereto. In other embodiments, the first edge segment S1e and the third edge segment S3e have different distances.

In this embodiment, the second edge segment S2e is substantially straight, but the disclosure is not limited thereto. In other embodiments, the second edge segment S2e can be a curve, such as an arc, a curve constituted by more than one arc, or a curve constituted by at least one arc and at least one straight line.

In this embodiment, the length of the second edge segment S2e can be designed according to requirements of actual applications, and the disclosure does not limit it.

In this embodiment, the second edge segment S2e can contact the magnetic sensor 22 in the aforementioned embodiments. In other embodiments, the second edge segment S2e can merely be adjacent to the magnetic sensor 22 but not contact it.

In this embodiment, the permeance body 231 is exemplarily a quadrilateral plate, but the disclosure is not limited thereto. In other embodiments, the shape of the permeance body 231 can be designed according to requirements of actual applications.

The following exemplarily introduces the magnetism guiding ability of magnetism guiding members with different appearances by experiments. The following experiments are made by the following conditions: selecting a ferrite plate as the material of the magnetism guiding members 23a to 23e, selecting a permanent magnet as the magnetic member 12, selecting a Hall sensor as the magnetic sensor 22, and setting the distance between the magnetic member 12 and the magnetic sensor 22 to be constant. First, a control group is designed that the magnetic flux caused by the above magnetic member 12 is directly measured by the above magnetic sensor 22 without the disposition of any magnetism guiding member, and then the magnetic sensor 22 can obtain the magnetic flux of 15 gausses. Then, different units of an experimental group are designed. In the first experimental unit, the second edge segment S2a of the above magnetism guiding member 23a is connected to the magnetic sensor 22, and the magnetism guiding member 23a is disposed under the magnetic sensor 22. In this case, the magnetic sensor 22, corresponding to the magnetism guiding member 23a that the extension direction of the first edge segment S1a and the extension direction of the third edge segment S3a have an angle θ2a of 40 degrees therebetween, can sense and obtain the magnetic flux of 40 gausses. In the second experimental unit, the second edge segment S2b of the above magnetism guiding member 23b is connected to the magnetic sensor 22, and the magnetism guiding member 23b is disposed under the magnetic sensor 22. In this case, the magnetic sensor 22, corresponding to the magnetism guiding member 23b that the extension direction of the first edge segment S1b and the extension direction of the third edge segment S3b have an angle θ2b of 60 degrees therebetween, can sense and obtain the magnetic flux of 35 gausses. In the third experimental unit, the second edge segment S2c of the above magnetism guiding member 23c is connected to the magnetic sensor 22, and the magnetism guiding member 23c is disposed under the magnetic sensor 22. In this case, the magnetic sensor 22, corresponding to the magnetism guiding member 23c that the extension direction of the first edge segment S1c and the extension direction of the third edge segment S3c have an angle θ2c of 90 degrees therebetween, can sense and obtain the magnetic flux of 31 gausses. In the fourth experimental unit, the second edge segment S2d of the above magnetism guiding member 23d is connected to the magnetic sensor 22, and the magnetism guiding member 23d is disposed under the magnetic sensor 22. In this case, the magnetic sensor 22, corresponding to the magnetism guiding member 23d that the extension direction of the first edge segment S1d and the extension direction of the third edge segment S3d have an angle θ2d of 130 degrees therebetween, can sense and obtain the magnetic flux of 24 gausses. In the fifth experimental unit, the second edge segment S2be of the above magnetism guiding member 23e is connected to the magnetic sensor 22, and the magnetism guiding member 23e is disposed under the magnetic sensor 22. In this case, the magnetic sensor 22 corresponding to the magnetism guiding member 23e can sense and obtain the magnetic flux of 32 gausses.

In view of the result, the various design of the appearance of magnetism guiding members can achieve an effect of strengthening magnetic force, especially magnetism guiding members that the extension direction of the first edge segment and the extension direction of the third edge segment have an angle ranging between 40 degrees and 130 degrees therebetween (e.g. the magnetism guiding members 23b, 23c and 23d) and magnetism guiding members having a semicircular construction with a cut portion (e.g. the magnetism guiding member 23e) have a better effect of strengthening magnetic force.

What is claimed is:

1. A magnetic electronic device, comprising:
    a first body comprising a first case and a magnetic member disposed inside the first case; and
    a second body comprising a second case and comprising a magnetic sensor, a magnetism guiding member and a switch control component all disposed inside the second case, the second case movably connected to the first body, the magnetic sensor disposed on the magnetism guiding member, the switch control component electrically connected to the magnetic sensor, the magnetism guiding member configured to guide a magnetic flux caused by the magnetic member, and the magnetic sensor configured to detect the magnetic flux caused by the magnetic member,
    wherein the first body is pivotally connected to the second body so that the first body is movable relatively to the second body between a first position and a second position, when the first body is at the second position, the magnetic sensor is disposed on a surface of the magnetism guiding member and between the magnetism guiding member and the magnetic member, when the magnetic flux of the magnetic member detected by the magnetic sensor is larger than a first value, the switch control component controls the switching-on-or-off of an electronic component, and
    wherein the magnetism guiding member comprises a permeance body and an extended member, and the extended member extends from a side of the permeance body, an edge of the extended member on a side far from the permeance body comprises a first edge segment, a second edge segment and a third edge segment, two ends of the second edge segment are respectively connected with the first edge segment and the third edge segment, the first edge segment and the third edge segment are connected with the permeance body, the first edge segment, the second edge segment and the third edge segment extend along the same plane, and an extension direction of the first edge segment and an extension direction of the third edge segment have an angle therebetween, and a range of the angle is between 40 degrees and 130 degrees.

2. The magnetic electronic device according to claim 1, wherein the first body has a first side, the second body has a second side, and the magnetic electronic device further comprises a pivot member pivotally connected to the first side of the first body and the second side of the second body.

3. The magnetic electronic device according to claim 2, wherein a distance between the magnetic member and the pivot member is equal to a distance between the magnetic sensor and the pivot member.

4. The magnetic electronic device according to claim 2, wherein a distance between the magnetic sensor and the magnetic member at the first position is longer than another distance between the magnetic sensor and the magnetic member at the second position.

5. The magnetic electronic device according to claim 4, wherein the magnetic flux caused by magnetic member detected by the magnetic sensor is smaller than the first value when the first body is at the first position; and the magnetic flux of the magnetic member detected by the magnetic sensor is larger than or equal to the first value when the first body is at the second position.

6. The magnetic electronic device according to claim 2, wherein a magnetic flux of the magnetic member propagated by the pivot member and detected by the magnetic sensor is constantly smaller than the first value since the magnetic sensor is far from the pivot member.

7. The magnetic electronic device according to claim 1, wherein the magnetic sensor is a Hall sensor.

8. The magnetic electronic device according to claim 1, wherein the magnetic member is a permanent magnet.

9. The magnetic electronic device according to claim 1, wherein the magnetism guiding member is made of a permeable material and is not magnetized by the magnetic member.

10. The magnetic electronic device according to claim 1, wherein the electronic component is a display, and the display is disposed to the first case or the second case.

11. The magnetic electronic device according to claim 1, wherein the edge of the extended member on the side far from the permeance body is an arc or has at least one corner.

12. The magnetic electronic device according to claim 11, wherein the extended member has a symmetric shape.

13. The magnetic electronic device according to claim 11, wherein the extended member has an asymmetric shape.

14. The magnetic electronic device according to claim 1, wherein the first edge segment and the third edge segment are straight.

15. The magnetic electronic device according to claim 14, wherein the extended member has a symmetric shape.

16. The magnetic electronic device according to claim 14, wherein the extended member has an asymmetric shape.

17. The magnetic electronic device according to claim 1, wherein the first edge segment and the third edge segment are curves.

18. The magnetic electronic device according to claim 17, wherein the extended member has a symmetric shape.

19. The magnetic electronic device according to claim 17, wherein the extended member has an asymmetric shape.

20. The magnetic electronic device according to claim 1, wherein the permeance body is a quadrilateral plate.

\* \* \* \* \*